Figure 11:
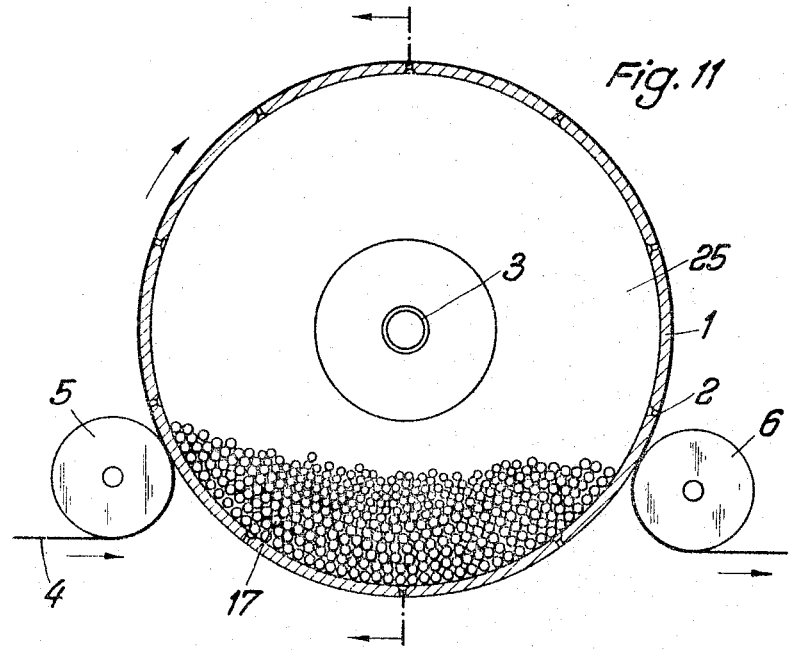

May 23, 1967  H. PASCHKE ETAL  3,320,680
DEVICES FOR THE CONTINUOUS TREATMENT OF MATERIAL WEBS
Filed Jan. 23, 1962  4 Sheets-Sheet 1
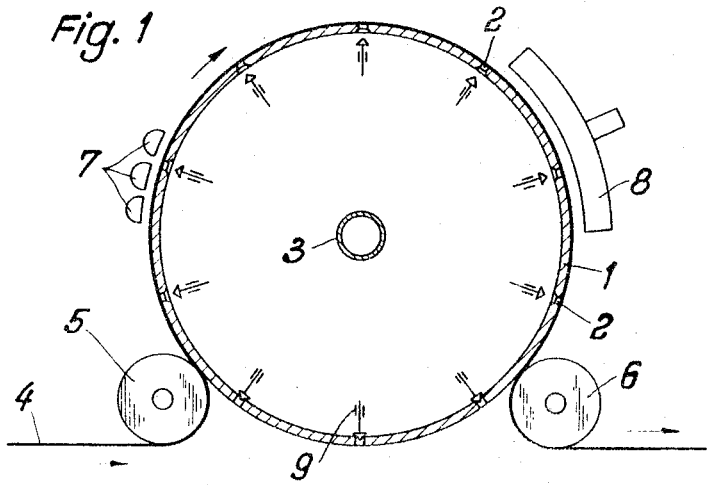
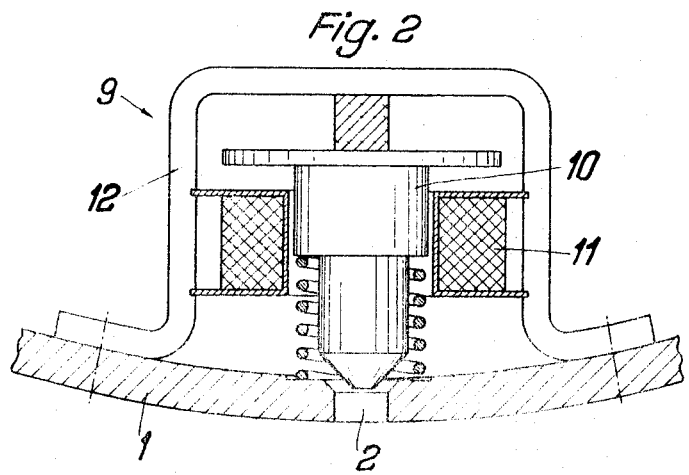
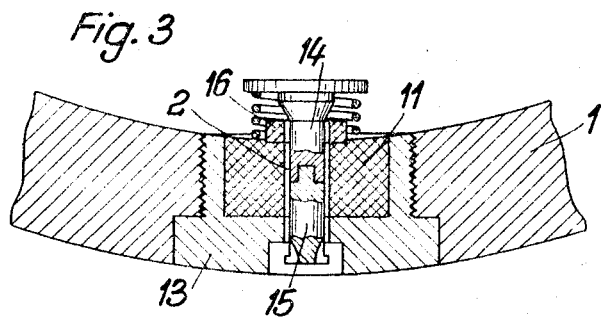
Inventors
H. Paschke
G. Missbach
By Watson, Cole, Grindle & Watson
Attys.

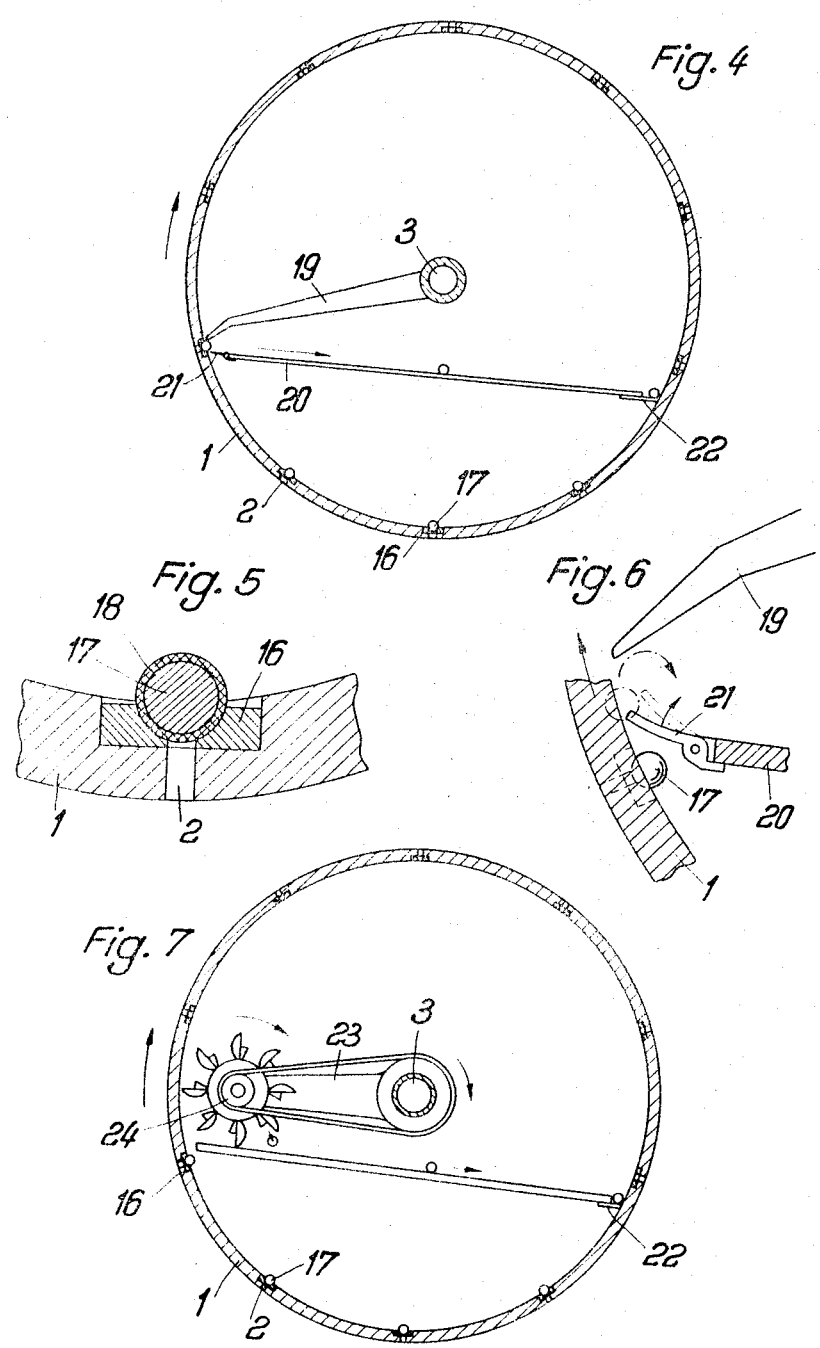

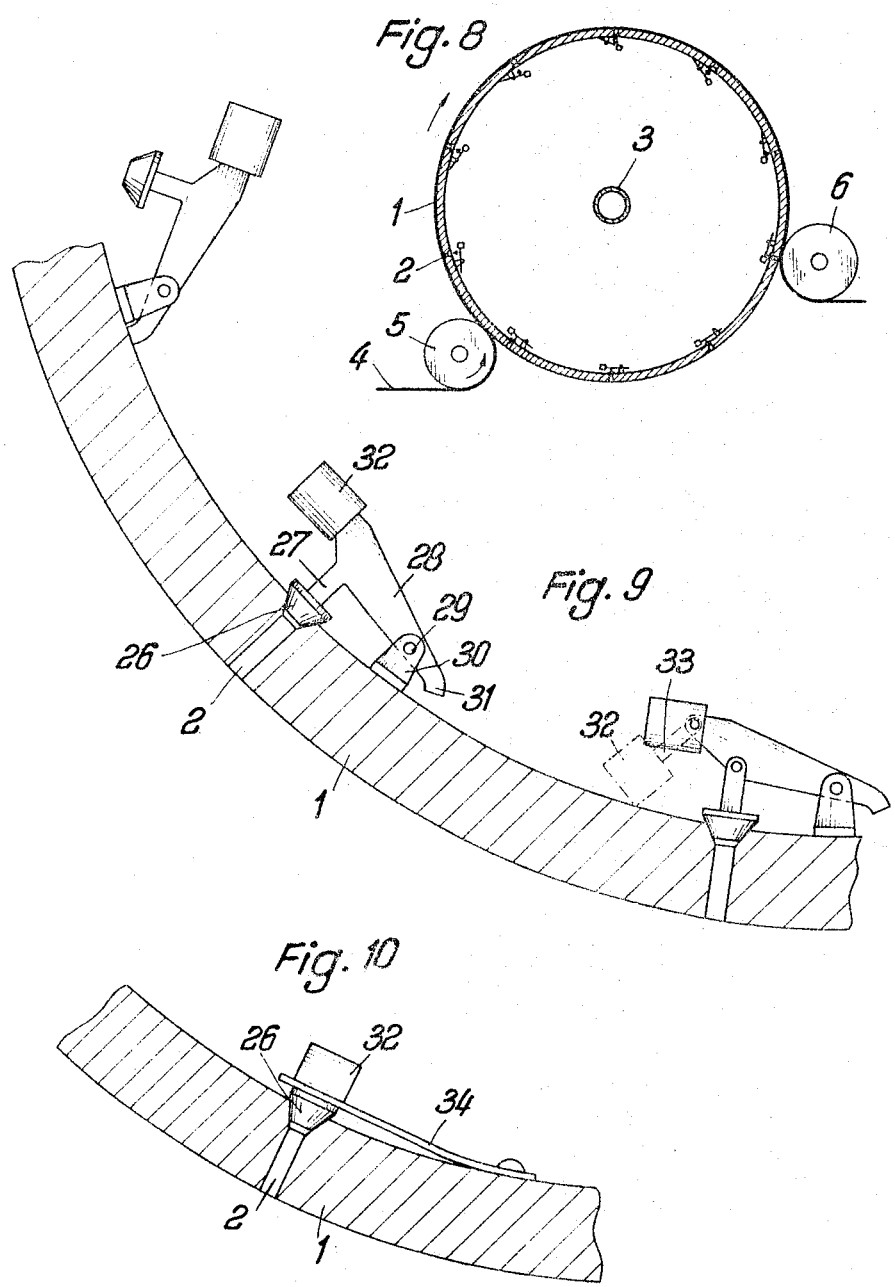

3,320,680
DEVICES FOR THE CONTINUOUS TREATMENT OF MATERIAL WEBS

Heinrich Paschke, Dusseldorf, and Günther Missbach, Berlin-Charlottenburg, Germany, assignors to Firma Rheinmetall G.m.b.H., Dusseldorf, Germany
Filed Jan. 23, 1962, Ser. No. 168,080
Claims priority, application Germany, Feb. 3, 1961, R 29,587
5 Claims. (Cl. 34—122)

The invention relates to a device for the continuous treatment, for example shaping or coating, of foil-like material webs, particularly synthetic foils, fabrics, paper webs and the like which consists of a rotating evacuable drum, carrying the foil-like material web to be treated and provided at its periphery with suction apertures, means being provided for closing the suction apertures not covered by the foil-like material web.

In suction drums of that type which are needed, for example, for carrying out in a continuous manner a deep-drawing process using a vacuum, suction should take place only in that part of the suction drum periphery which is covered by the web, since the vacuum in the suction drum is very quickly reduced or destroyed by unwanted air sucked in through uncovered suction apertures. Therefore, a confined stationary suction chamber must be created in the rotating suction drum, or means must be provided for closing the suction apertures not covered by the web.

In numerous known solutions of this problem, the suction drum is provided in its interior with a plurality of radially arranged cells which participate in the rotation and, at the end faces of the drum, communicate with the suction duct by way of a valve plate in certain positions only. The difficulties created by the sealing of the end faces and the high manufacturing costs of such devices lead to numerous disadvantages. Therefore, cell-less suction cylinders have been developed, for example for filtering purposes, and in the paper-making industry, in which a stationary suction chamber is sealed off from the rotating sieve drum by means of sealing bars. Attempts were made to perfect that sealing arrangement by shaping the sealing bars in a special way, but large expenditure of technical effort and considerable wear of the wiping parts cannot be avoided.

It is also known to form a suction chamber within the suction drum by means of a plurality of rubber-lined rollers which are moved along by the rotating suction drum while rolling on one another and seal a predetermined zone of the suction drum from the remaining zone. Furthermore, suction drums are known in which drums, bands or other endlessly rotating means moved along in the interior enable predetermined zones of the suction drum to be covered. Those cover means are particularly advantageous in suction drums having a sieve-like surface.

In contradistinction to the state of the art revealed above, the present invention has for its object the arrangement of means in a suction drum which will shut off the suction apertures to be covered in a particularly simple and safe manner and to achieve easily controllable shuttering in regard to both area and position over the entire drum circumference.

The present invention, therefore, proposes to control individual suction apertures from the drum interior by means of valves. Since, for example, in a vacuum, a deep drawing or a coating process for foils individually arranged suction apertures only are required which need not be nearly as numerous as in a sieve jacket, it becomes possible to provide a suction drum for special purposes in which the suction apertures not covered by the foil etc. are closed in a simple and reliable manner.

It is particularly convenient to arrange the valves individually or in rows or groups and to have them controllable in such arrays. The valves may be externally controlled magnetic valves, for example, and are preferably designed as valve units which can be fitted, for example screwed, together with their supports into the drum surface from outside the latter. It is also an advantage if they are controlled by means of externally adjustable contact arms in such a way that the suction apertures can easily be shut off in any part-area or position of the suction drum surface.

Magnetic valves with permanent magnets may be employed, preferably annular magnets, which serve at the same time as valve seats. The valve elements could then be balls, for example, which are pressed against the valve seat either directly or against an interposed resilient medium by magnetic force of attraction. These balls are lifted off co-operating valve seats by stationary, preferably adjustable, mechanical or magnetic lifting devices with which are associated inclined chutes, leading to an opposite drum wall, for intercepting and returning the valve balls. To ensure the safe conveyance of those valve balls into the return chutes, flaps are provided, for example at the leading end of the chutes, which yield as the balls travel past them and then snap back into their initial position, thus to intercept the detached valve balls. The lifting devices may also be of rotary form, for example bucket wheels, preferably driven by the drum, which detach the valve balls and convey them to the return chutes.

When valve balls are used, it is an advantage if the total number of balls is greater than the number of valve seats and if the several rows of valves are separated or bordered by partitions which may be stationary or rotate with the drum. Then, separate ball-lifting and return devices are allotted to each row of valves. The drum is preferably made of non-managetisable material, for example aluminum or plastic, particularly when magnetic valves are employed.

In another embodiment of the invention, the valves are operated mechanically, for example gravity-actuated valves may be used. In this case, the valve elements of the individual valves are fixed in each case to a rocking arm pivotable about a hinge, the hinges being arranged on supports which are preferably height-adjustable and preferably fastened to the drum jacket. Furthermore, the valve elements of the individual valves may each be fitted to a resilient arm, for example a flat spring, which at one end is preferably fastened to the drum jacket. In both cases it is advantageous if the gravitational control of the suction apertures of the drum is aided by ballast weight provided on the mechanical valve elements, said weights being also fitted to adjustable arms so that by the adjustment of these arms the centre of gravity of the entire valve element, and thus within certain limits the commencement and duration of the response of the individual valves, become controllable.

An object of the invention is achieved, in a particularly simple manner, by providing a large number of balls serving as valve elements and which are loose in the drum. The valve seats for those valve balls are preferably shaped in such a way that the centre of gravity of the valve balls is situated within the annular valve seat so that the balls, while being capable of rolling or falling out of the valve seats, cannot be pushed out of these seats.

Figure 12:
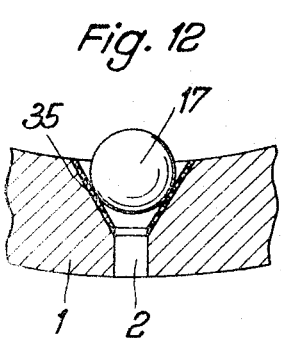
Figure 13:
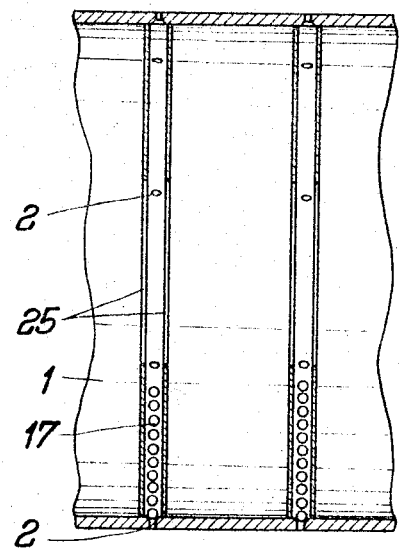

By way of example only, embodiments of the invention will now be described in greater detail with reference to the accompanying drawings in which:

FIG. 1 is a diagrammatic cross section of an embodiment of the invention in which suction apertures of the drum can be shut by externally-energized magnetic valves, FIG. 2 is a part-sectional view of a single magnetic valve of the embodiment of FIG. 1, on an enlarged scale, FIG. 3 is a sectional view of an alternative construction of a magnetic valve on an enlarged scale, FIG. 4 is a diagrammatic cross section of another embodiment of the invention in which the suction apertures of the drum can be shut by magnetic valves with permanent magnets, FIG. 5 is a sectional view of a single valve of the embodiment of FIG. 4, on an enlarged scale, FIG. 6 is a part-sectional view of a detail of the leading end of the ball-return chute in the embodiment of FIG. 4, on an enlarged scale, FIG. 7 is a diagrammatic cross section of a different construction of the lifting device of the embodiment of FIG. 4, designed as a bucket wheel, FIG. 8 is a diagrammatic cross section of a further embodiment of the invention in which the suction apertures of the drum can be shut by mechanically actuated valves, FIG. 9 shows individual valves of the embodiment of FIG. 8, on an enlarged scale, FIG. 10 shows another construction of the valves of the embodiment of FIG. 8, on an enlarged scale, FIG. 11 is a diagrammatic cross section of a further embodiment of the invention in which the suction apertures of the drum can be shut by means of a large number of valve balls, loose in the drum, FIG. 12 is a sectional view of the construction of a valve seat of the embodiment of FIG. 11, on an enlarged scale, and FIG. 13 is a longitudinal section of a detail of a drum construction according to the embodiments shown in FIG. 4 or FIG. 11.

The drawings show embodiments of the invention suitable for the continuous treatment of foil-like material webs, in particular, for the treatment of plastic foils and each consists of a rotating drum 1 which is provided at its periphery with a number of separate apertures 2. The drum 1 is enclosed at its end faces and is rotatable about a hollow shaft 3, provided with bores, for example, through which the drum interior communicated with an evacuating system, not shown. On the outer circumference of the drum 1 there are provided one or more moulds or models not shown which contain for example the pattern to be imparted to the foil or the required design and which communicate, preferably at the lowest point of the pattern or of the individual mould cavities, with the evacuated interior of the drum 1 through the apertures 2.

The foil to be treated is drawn off a take-up drum not shown and is fed as a web 4 to the drum 1 via a deflection feed roller 5. It is then conducted over the mould or moulds or models provided on the drum periphery and eventually leaves the drum via a deflection roller 6. In spaced relationship with the foil or the moulds are infrared radiators 7 or other heaters which ensure the plastification of the foil web 4. A cooling device 8 is provided by means of which cold air can be blown towards the foil web after treatment and the foil is thus solidified.

In order to ensure that the foil establishes the best possible contact with the shape of the mould, the drum 1 is evacuated in known manner. In that way the foil web will be drawn by differential pressure into recesses of the mould, i.e., the mould cavities or mould outlines, and remains permanently shaped at such points.

In order to prevent in the zone not covered by the foil and situated between the deflection rollers 5, 6 unwanted ingress of air to the drum interior through the suction apertures 2 of the drum 1 which would impair or destroy the vacuum, the suction apertures 2 are controlled by means of valves located in the drum interior. The suction apertures are arranged in rows or groups.

In the embodiment shown in FIG. 1 the valves are externally-energised magnetic valves 9 and are constructed, for example, as shown in FIG. 2. Each magnetic valve 9 consists here of a valve element 10 surrounded by a coil 11 and sprung axially by means of resilient elements. The entire magnetic valve is surrounded by a bracket 12 fastened to the inner drum surface and each suction aperture 2 is allotted its own valve unit.

FIG. 3 shows a differently-designed, externally-energised magnetic valve. A holding element 13 is connected to the drum jacket 1 and has at its centre a suction aperture 2 which is surrounded by a coil 11, set into the holding element 13. The valve element consists of a component 14 of magnetic material, for example iron, and a component 15 of non-magnetic material, for example plastic, and is arranged so as to be movable in the suction aperture 2, resilient valve-opening means being provided if necessary. When the coil 11 is energised, the iron component 14 of the valve element is attracted and pressed against a ring 16 which serves as a valve seat and is made of a resilient material. In this construction of a magnetic valve it is particularly useful if all valve components are contained in the holding element 13 and form a valve unit capable of being screwed into the jacket of the drum 1 from the outside so that individual valve units can easily be replaced.

The externally-energised magnetic valves shown in FIGS. 1 to 3 are arranged in rows or groups and are preferably controlled row- or groupwise, for example by externally adjustable contact arms. Those control devices have not been shown in the drawings.

FIGS. 4 to 7 show another embodiment of the invention in which the suction apertures 2 of the drum 1 are controlled by magnetic valves with permanent magnets. The permanent magnets are the annular magnets 16 and also serve as valve seats. The valve elements are balls 17 which have a thin coating 18 of elastic material so as to improve their sealing effect. The valve seats may likewise be coated with a thin layer of resilient material.

One or more valve lifting devices in the form of arms 19 are adjustably mounted in the drum 1 at a desired point, being mounted in the example shown in FIG. 4 on the drum shaft 3. Below those arms 19, chutes 20 are arranged in a manner such that they are adjustable with the arms, the chutes being inclined and leading to the opposite side of the drum wall.

In order to ensure that the valve balls 17 pass safely into the chutes 20, the leading ends of these chutes 20 are provided with flaps 21—as shown in FIG. 6—which yield when the balls 17 which adhere to their valve seats travel past them, then snap back into their initial position and thus intercept the valve balls which are detached shortly afterwards from their valve seats by the arms 19, the flaps allowing the balls to roll into the chutes 20. The trailing ends of the chutes 20 are provided with resilient flaps 22 for example of elastic material which, while being capable of supporting a valve ball 17, will yield when acted upon by a stronger force such as is produced when a ball 17 on the flap 22 is attracted and urged against a valve seat by an annular magnet 16 travelling past the flap.

FIG. 7 shows another construction of valve lifting device. Arms 23 mounted in desired lifting positions are adjustably attached to the drum shaft 3 and bucket wheels 24 are arranged on the arms 23 and are preferably driven by the drum 1. In the example shown in FIG. 7, the bucket wheels 24 rotate in the same sense as the drum but with a greater peripheral velocity so that the valve balls 17 are detached in the rotary direction of the drum from the annular magnets 16 which serve as valve seats and are conveyed in the pockets of the bucket wheels 24 to chutes 20 situated below them.

Means of any other design may also be employed as lifting, return and storage or re-application devices for the valve balls 17. Thus, for example, it is also possible to use magnetic lifting devices and return chutes.

In the embodiments illustrated in FIGS. 4 to 7, the magnetic valves are arranged in adjacent rows, each valve row having allocated to it separate ball lifting and returning devices. Moreover, there are more valve balls 17 than there are valve seats in the drum so that the suction apertures are reliably shut off at the desired points. In order to prevent the valve balls from migrating towards one drum end, for example, when the drum occupies an inclined position, the several valve rows are bordered by partitions 25 rotating with the drum, such as shown in FIG. 13.

Where magnetic valves, particularly permanent magnetic valves are employed which are seated in the drum jacket, it is also an advantage if the drum 1 is made of a non-magnetisable material, for example aluminum or plastic.

FIGS. 8 to 10 illustrate an embodiment of the invention in which the suction apertures of the drum are controlled mechanically actuated valves. The individual valve elements consist of a valve head 26 which is connected by an arm 27 to a rocking arm 28—as shown in FIG. 9—which latter is in turn supported so as to pivot about a hinge 29 supported by a bracket 30. The brackets 30 are mounted on the inner drum surface. Each rocker arm 28 is provided with a stop 31 at its end projecting beyond the pivoting point which stop bears on the drum jacket and thus limits the valve stroke when the valve element is detached. In order to increase mass and thus to aid the gravitational control of the suction apertures 2 of the drum 1, ballast weights 32 are fitted to the rocker arms 28.

Since the commencement and duration of response of such a valve depends upon the position of the centre of gravity of the valve element in relation to its pivoting point, the duration of the closed period of the valve may, within certain limits, be set by means of suitable arrangement of the several valve components. Thus, the ballast weights 32 may be carried for example on adjustable arms 33 as is indicated by broken lines in FIG. 9. Also, the brackets 30 may be of adjustable height, and in this case the arms 27 are likewise adjustably connected to the rocker arms 28.

Instead of being fitted to the rocker arm 28, the valve head 26 may be fitted to a resilient arm 34 as shown in FIG. 10. The arm 34 is a flat spring which is fastened at one end to the drum jacket and acts, at its other end, upon the valve head 26. Since the gravitational forces at one time aid the spring forces and at another time counteract them, depending upon the position of the valve, the commencement and duration of the valve response may here, too, be adjustable within certain limits by means of ballast weights or adjustable intermediate elements.

The mechanical valves may also take other forms.

A particularly simple embodiment of the invention is illustrated in FIGS. 11 to 14. The drum 1 is partly filled with a large number of valve balls 17. The multitude of balls acts like a hydraulic filling material, i.e., according to similar kinetic and pressure laws. Gravitational pressure forces are exerted on valve balls 17, which happen to become situated in the valve seats, by balls positioned behind the former. In order to prevent, however, the balls at any time acting as valve balls being displaced from their seats by the other balls acting upon them, the valve seats are shaped in such a way that the gravitational centre of a valve ball 17 must occupy a position within the valve seat, i.e., each seat is a hollow cone surrounding the major part of a valve ball on the seat. The valve seats, moreover, having a lining 35 of resilient material which improves the sealing effect. It is also possible, however, to provide the valve balls 17 with such a lining.

The size of the covered drum zone may be varied in the most simple maner by filling the drum with a greater or smaller number of balls. In order to save balls, it is convenient to separate individual valve rows by partitions 25 rotating with the drum 1—as illustrated in FIG. 13.

The invention is not limited to the embodiments illustrated above. Above all, it also comprises any combination of the features by which the embodiments described here are characterised in particular, and all valves of any construction whatever which are capable of being arranged within a drum and of shutting suction apertures from the drum interior.

Nor is the invention confined to the applications mentioned here. It may be employed wherever suction apertures of a drum are to be covered or shut-off within a certain drum zone. Its field of application also extends to suction drums used in the paper-making industry, for example for drying paper pulp, and to suction drums used for filtering, for example for separating solids from liquids. Besides, the invention may be employed in the case of vacuum drums in capsule-making machines producing, for example, pharmaceutical capsules of gelatine or like substances.

What is claimed is:

1. A device for the continuous treatment of material in web form, comprising an evacuable and rotatable drum for supporting the web to be treated, said drum having suction apertures in its periphery, means for shutting off the suction apertures which are not covered by the web by means of a valve for each suction aperture and controlled from the interior of the drum, said valves being controlled within the drum and each valve being magnetically actuated and being insertable into a jacket of the drum.

2. A device for the continuous treatment of material in web form, comprising an evacuable and rotatable drum for supporting the web to be treated, said drum having suction apertures in its periphery, means for shutting off the suction apertures which are not covered by the web by means of a valve for each suction aperture and controlled from the interior of the drum, said valves being controlled within the drum and each valve is a magnetic valve having an energizable coil.

3. A device for the continuous treatment of foil-like materials particularly plastic foils, fabrics, paper and the like in web form to shape, coat and the like such materials, comprising a rotatable drum which is evacuated to carry the foil to be treated, said drum having suction apertures in a periphery thereof, and means for closing the suction apertures provided on the inside of the drum not covered by the foil, said means comprising valves to close the suction apertures and acting directly upon the apertures with the latter acting as valve seats.

4. A device according to claim 3, in which each valve is a magnetic valve having a valve element operative in a coil.

5. A device according to claim 3, in which each valve is a magnetic valve having a valve element operative in a coil mounted in a bracket secured to the inside surface of the drum adjacent each aperture.

References Cited by the Examiner

UNITED STATES PATENTS

| 1,432,645 | 10/1922 | Vaughan | 34—115 |
| 1,434,170 | 10/1922 | Vaughan | 34—115 |
| 1,892,917 | 1/1933 | Walker et al. | 251—140 |
| 2,161,127 | 6/1939 | Bowman | 137—45 |
| 2,368,341 | 1/1945 | Zuckerman | 34—115 |
| 2,526,318 | 10/1950 | Battin | 34—62 |

FREDERICK L. MATTESON, Jr., *Primary Examiner.*

NORMAN YUDKOFF, WILLIAM F. O'DEA,
*Examiners.*

F. E. DRUMMOND, C. R. REMKE,
*Assistant Examiners.*